US012080074B2

United States Patent
Song et al.

(10) Patent No.: US 12,080,074 B2
(45) Date of Patent: Sep. 3, 2024

(54) CENTER-BASED DETECTION AND TRACKING

(71) Applicant: Zoox, Inc., Foster City, CA (US)

(72) Inventors: Qian Song, San Mateo, CA (US);
Benjamin Isaac Zwiebel, Burlingame, CA (US)

(73) Assignee: Zoox, Inc., Foster City, CA (US)

( * ) Notice: Subject to any disclaimer, the term of this patent is extended or adjusted under 35 U.S.C. 154(b) by 323 days.

(21) Appl. No.: 17/537,920

(22) Filed: Nov. 30, 2021

(65) Prior Publication Data

US 2023/0169777 A1 Jun. 1, 2023

(51) Int. Cl.
*G06V 20/58* (2022.01)
*B60W 60/00* (2020.01)
*G06N 20/00* (2019.01)
*G06T 7/20* (2017.01)
*G06T 7/70* (2017.01)
(Continued)

(52) U.S. Cl.
CPC ........... *G06V 20/58* (2022.01); *B60W 60/001* (2020.02); *G06N 20/00* (2019.01); *G06T 7/20* (2013.01); *G06T 7/70* (2017.01); *G06V 10/25* (2022.01); *G06V 10/751* (2022.01); *G06T 2207/20081* (2013.01); *G06T 2207/30252* (2013.01)

(58) Field of Classification Search
CPC ..... B60W 60/001; G06N 3/084; G06N 20/00; G06T 7/20; G06T 7/70; G06T 7/73; G06T 2207/20081; G06T 2207/20084; G06T 2207/30252; G06V 10/25; G06V 10/70; G06V 10/751; G06V 20/58
See application file for complete search history.

(56) References Cited

U.S. PATENT DOCUMENTS 10,733,482 B1 * 8/2020 Lee ........................... G06T 7/74
2019/0266418 A1 * 8/2019 Xu ........................ G06V 10/457
(Continued)

FOREIGN PATENT DOCUMENTS

| CN | 112949614 A | 6/2021 |
| KR | 20160065703 A | 6/2016 |
| WO | WO2019246250 A1 | 12/2019 |

OTHER PUBLICATIONS

Choi et al. "Uncertainty-based object detector for autonomous driving embedded platforms." 2020 2nd IEEE international conference on artificial intelligence circuits and systems (AICAS). IEEE, 2020. (Year: 2020).*

(Continued)

*Primary Examiner* — Katrina R Fujita
(74) *Attorney, Agent, or Firm* — Lee & Hayes, P.C.

(57) ABSTRACT

Techniques for detecting and tracking objects in an environment are discussed herein. For example, techniques can include detecting a center point of a block of pixels associated with an object. Unimodal (e.g., Gaussian) confidence values may be determined for a group of pixels associated with an object. Proposed detection box center points may be determined based on the Gaussian confidence values of the pixels and an output detection box may be determined using filtering and/or suppression techniques. Further, a machine-learned model can be trained by determining parameters of a center pixel of the detection box and a focal loss based on the unimodal confidence value which can then be back-propagated to the other pixels of the detection.

20 Claims, 5 Drawing Sheets

(51) Int. Cl.
    *G06V 10/25*        (2022.01)
    *G06V 10/75*        (2022.01)

(56)            References Cited

U.S. PATENT DOCUMENTS

| 2020/0174481 | A1* | 6/2020  | Van Heukelom ...... G06N 3/045 |
| 2020/0257940 | A1* | 8/2020  | Leung ................... G06V 20/52 |
| 2021/0046954 | A1* | 2/2021  | Haynes ........... B60W 60/00272 |
| 2021/0056713 | A1* | 2/2021  | Rangesh ................ G01S 17/89 |
| 2021/0097277 | A1  | 4/2021  | Hirai et al. |
| 2021/0405638 | A1* | 12/2021 | Boyraz ................. G06V 20/64 |
| 2022/0012466 | A1* | 1/2022  | Taghavi ............. G06F 18/2163 |
| 2022/0291387 | A1* | 9/2022  | Pacala .................. G01S 7/4817 |
| 2023/0043061 | A1* | 2/2023  | Yang .................... G01S 17/931 |

OTHER PUBLICATIONS

Choi, et al. "Gaussian yolov3: An accurate and fast object detector using localization uncertainty for autonomous driving." Proceedings of the IEEE/CVF International conference on computer vision. 2019. (Year: 2019).*
Li et al. "Confidence-aware object detection based on MobileNetv2 for autonomous driving." Sensors 21.7 (Mar. 2021): 2380. (Year: 2021).*
Meyer et al. LaserNet: An Efficient Probabilistic 3D Object Detector for Autonomous Driving. In: IEEE/CVF Conference on Computer Vision and Pattern Recognition (CVPR). Jun. 20, 2019, pp. 12677-12686.
PCT Search Report and Written Opinion mailed Mar. 15, 2023 for PCT application No. PCT/US2022/080211, 11 pages.

\* cited by examiner

CENTER-BASED DETECTION AND TRACKING

BACKGROUND

Various systems and techniques are utilized by autonomous vehicles to perform detection and tracking of objects, such as vehicles, pedestrians, and bicycles, in an environment. Detection and tracking techniques may use sensors to capture data in the environment. Captured sensor data can be processed for use in detecting objects in the environment and generating bounding boxes representing such objects. These bounding boxes can then be used to navigate an autonomous vehicle in the environment. Generating bounding boxes that accurately represent objects present in an environment based on sensor data may, at times, present challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
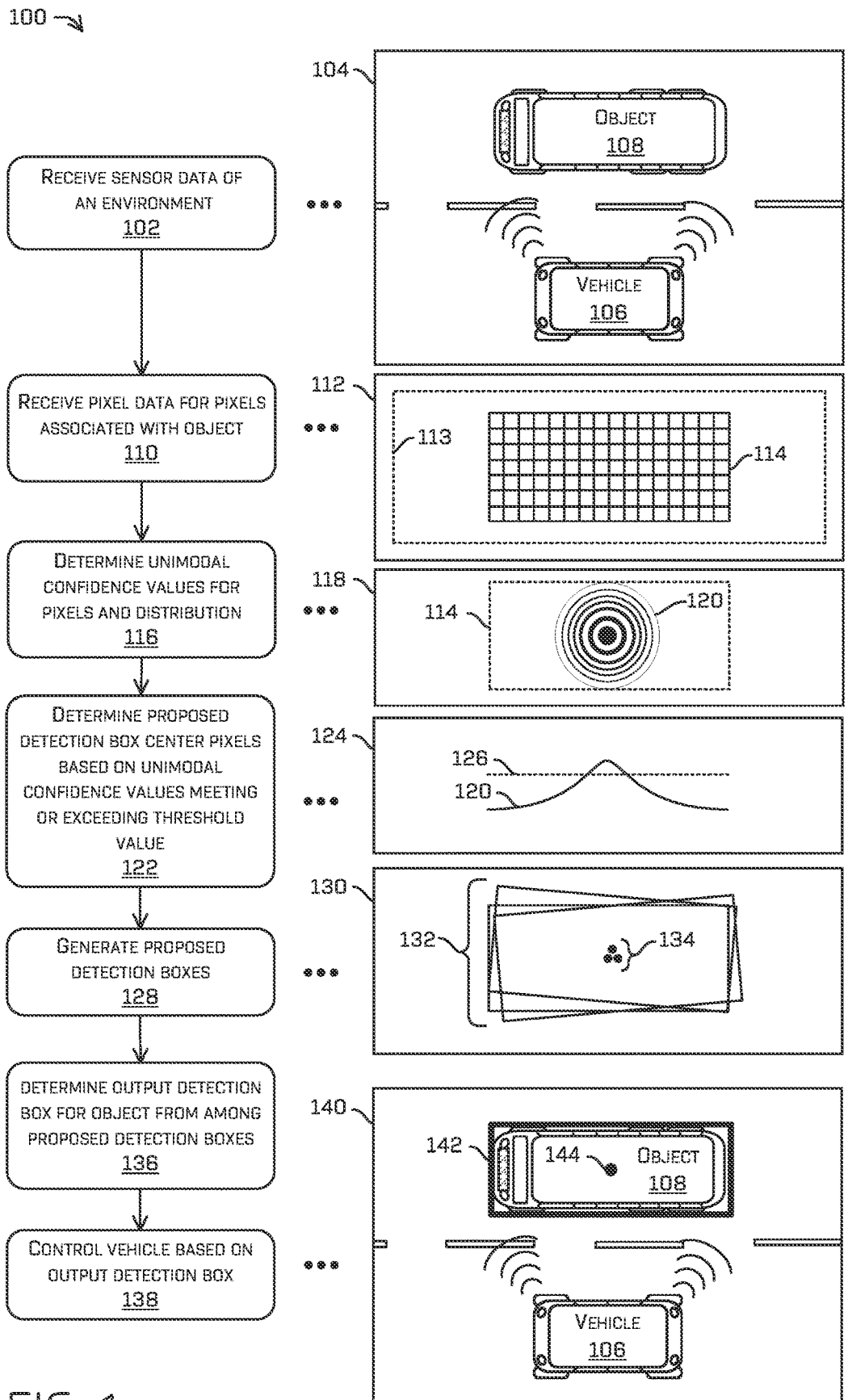
FIG. 1 is a pictorial flow diagram of an example process for generating a detection box for an object in an environment using center-based detection, in accordance with examples of the disclosure.

Techniques for detecting and tracking objects in an environment are discussed herein. For example, techniques may include determining, using a machine-learned model (e.g., in inference mode), candidate bounding boxes for an object by determining the points or pixels of a group of pixels associated with the object that are associated with unimodal confidence values that meet or exceed a threshold (e.g., based on the unimodal distribution of the associated confidence values). Bounding boxes for the determined points or pixels may be decoded based on the object data associated with such points or pixels, and a detection box for the object may be determine based on those bounding boxes (e.g., using non-maximum suppression). In training mode, the machine-learned model may be trained by propagating one or more object data parameters of a determined object center point or pixel throughout the remaining points or pixels in the group of pixels associated with an object. A loss may then be determined for individual points or pixels in the group of pixels and backpropagated as the model is trained.

In certain techniques, the center point may be determined using a binary mask to pixels to determine pixels having confidence value sufficient for association with an object (e.g., a non-zero confidence value or a confidence value above a minimum threshold). In such techniques, using a binary mask in training mode gives equal weight to the object data values of all points or pixels potentially associated with an object, even though those points or pixels that are more distant from the center of the object can be less likely to represent accurate object detection information. Points or pixels further from the center of an object are less likely to represent accurate object detection information because they are more susceptible to noise, and therefore may have less reliable object information. The use of a binary mask in inference mode is also resource intensive as it requires the determination of many more candidate bounding boxes in the process of determining a detection box for an object than if a unimodal mask is used as described herein. Because the unimodal confidence value and masking techniques described herein may result in more accurate determination of candidate center points or pixels, the techniques described herein allow for the processing (e.g., using non-maximum suppression) of fewer candidate bounding boxes to determine a detection box for an object, thereby increasing system speed and efficiency. The unimodal confidence values and associated object data determined according to the systems and techniques described herein may also allow other systems and processed (e.g., prediction, planning, etc.) to obtain greater insight into an environment and thereby generate more accurate data for controlling a vehicle.

In examples, systems and techniques for improved detection of a center point of a block of pixels associated with an object are disclosed. A machine-learned model may determine a group of pixels (e.g., as represented in sensor data) may be determined to be associated with an object. The model may determine a unimodal confidence value (e.g., Gaussian confidence value) for the individual pixels in the group of pixels may then be determined and a curve representing the unimodal distribution of the confidence values for the group of pixels may be generated. Using this curve, the pixels having confidence values above a threshold may be determined as proposed detection box center points. Candidate detection boxes associated with these proposed center points may be generated (e.g., decoded based on pixel data associated with the proposed center points) and the model may then determine an output detection box based on the candidate detection boxes (e.g., using one or more various techniques, such as non-maximum suppression (NMS)).

The machine-learned model may be trained by propagating one or more parameters (e.g., velocity, center coordinates and/or offset values, length, width, direction, stationariness, etc.) of a determined center pixel of an output detection box to the other pixels of the output detection box to ensure consistent parameters throughout the box. A loss may then be determined for the other pixels of the output detection box based on the unimodal confidence value for the associated pixel and backpropagated as the model is trained.

The systems and techniques described herein may be directed to leveraging sensor data and pixel data to enable a vehicle, such as an autonomous vehicle, to more accurately identify and locate objects in an environment and therefore navigate through the environment more safely by circumventing such objects. The systems and techniques described herein can utilize unimodal functions to more accurately determine a potential center point of an output detection box determined by a machine-learned model for an object in an environment, and therefore facilitate the generation of a more accurate detection box for the object. The systems and techniques described herein can also increase the efficiency of output detection box determination operations because fewer candidate detection boxes may be determined using the unimodal operations described herein (e.g., because there are fewer proposed center points determined), thereby reducing the processing required to determine an output detection box from among the candidate detection boxes.

The systems and techniques described herein can also increase the accuracy of machine-learned models by training such models to determine more accurate object data by populating one or more parameters, such as a velocity parameter, from a center pixel determined according to the systems and techniques described herein in other pixels in the detection box and backpropagating the loss associated with such pixels based on the confidence values of the pixels. This in turn may improve the accuracy of object detection and improve safety outcomes because the center pixel of a detection box determined as described herein may be a more accurate representation of the detected object than center pixels determined using conventional techniques. Therefore, the examples described herein may result in increased certainty of object detections, thereby allowing an autonomous vehicle to generate more accurate and/or safer trajectories for the autonomous vehicle to traverse in the environment. For example, techniques described herein may be faster and/or more robust than conventional techniques, as they may increase the reliability of the determination of dimensions and other physical parameters of objects in the environment, reducing the likelihood of failing to identify or misidentifying an object. That is, techniques described herein provide a technological improvement over existing object detection, localization, tracking, and/or navigation technology. In addition to improving the accuracy with which upscaled data structures can be used to determine objects and correctly locate such objects, the systems and techniques described herein can provide a smoother ride and improve safety outcomes by, for example, more accurately providing safe passage to an intended destination.

The systems and techniques described herein can be implemented in a number of ways. Example implementations are provided below with reference to the following figures. Although discussed in the context of an autonomous vehicle, the techniques described herein can be applied to a variety of systems (e.g., a sensor system or a robotic platform) and are not limited to autonomous vehicles. For example, the techniques described herein can be applied to semi-autonomous and/or manually operated vehicle. In another example, the techniques can be utilized in an aviation or nautical context, or in any system involving objects or entities having dimensions and/or other physical parameters that may not be known to the system. Further, although discussed in the context of originating with particular types of sensor data and processing with particular types of components, data and data structures as described herein can include any two-dimensional, three-dimensional, or multi-dimensional data such as other types of image data (e.g., stereo cameras, time-of-flight data, and the like)), radar data, sonar data, and the like. Additionally, the techniques described herein can be used with real data (e.g., captured using sensor(s)), simulated data (e.g., generated by a simulator) or any combination of the two. Additionally, although particular examples are described herein using Gaussian confidence values and distributions, other techniques using other types of unimodal confidence values and distributions are contemplated.

Figure 5:
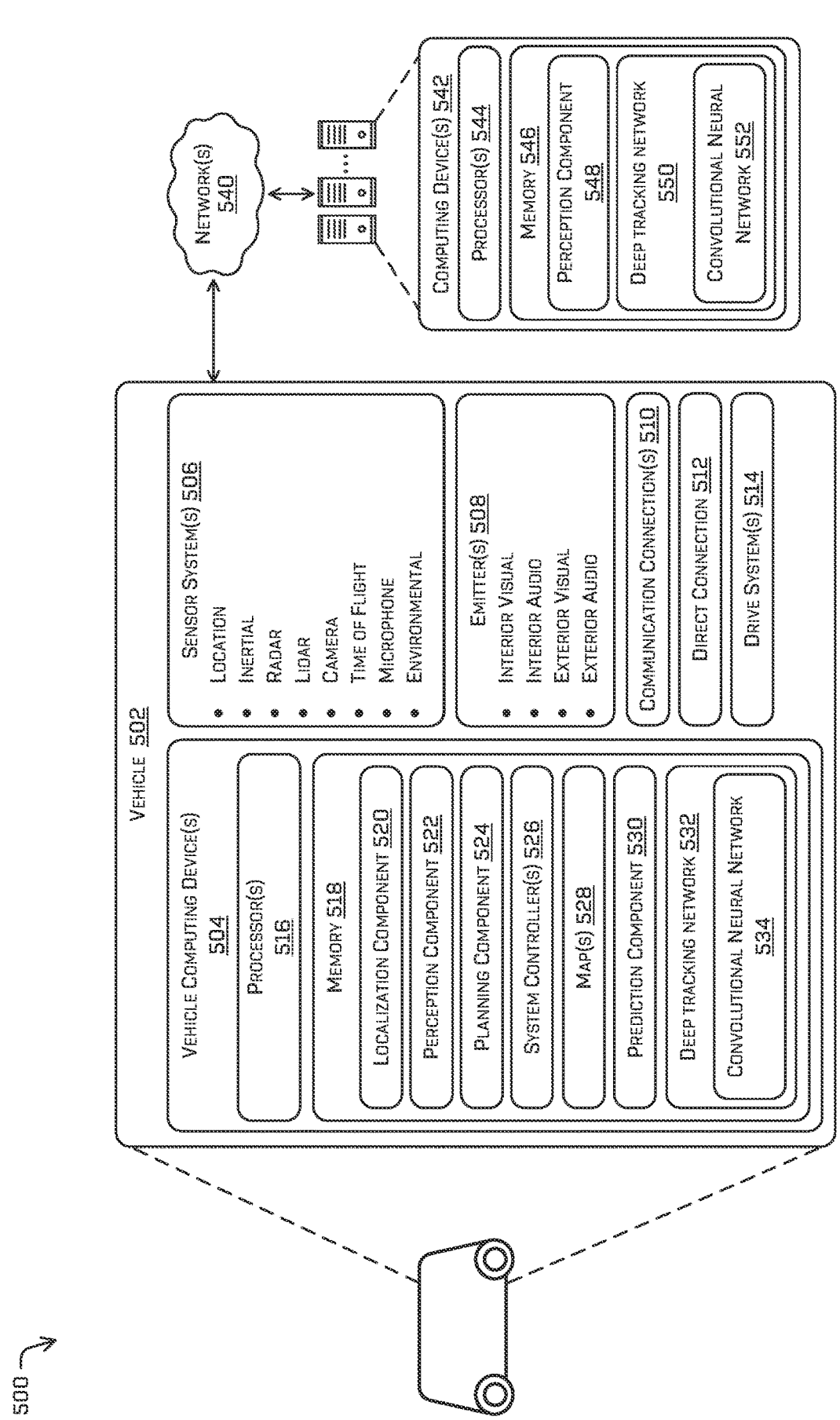
FIG. 5 depicts a block diagram of an example system for implementing the methods described herein.

FIG. 1 is a pictorial flow diagram of an example process 100 for generating a detection box for use in object detection and tracking. In examples, one or more operations of the process 100 may be implemented by a vehicle computing system, such as by using one or more of the components and systems illustrated in FIG. 5 and described below. For example, one or more components and systems can include those associated with a deep tracking network 532 illustrated in FIG. 5. In examples, the one or more operations of the process 100 may be performed by a remote system in communication with a vehicle, such as the deep tracking network 550 illustrated in FIG. 5. In still other examples, the one or more operations of the process 100 may be performed by a combination of a remote system and a vehicle computing systems. However, the process 100 is not limited to being performed by such components and systems, and the components and systems of FIG. 5 are not limited to performing the process 100.

The one or more operations of the process 100, as well as any other operations, systems, and techniques described herein, may be directed to detecting any type and number of objects, including one or more vehicles, pedestrians, and bicycles. For example, the process 100 and/or any other processes described herein may be implemented one or more object detection networks (e.g., that may be configured in a deep tracking network). Individual networks of such object detection networks may be implemented for particular objects (e.g., in parallel). For example, a tracking network may implement, in parallel (or otherwise), a vehicle detection network, a pedestrian detection network, and/or a bicycle detection network. In another example, a tracking network may implement, in parallel (or otherwise), one or more coarse-grained vehicle detection networks, one or more fine-grained vehicle detection networks, one or more coarse-grained pedestrians and/or bicycle detection networks, and one or more fine-grained pedestrians and/or bicycle detection networks. Any other suitable detection network and/or detection system configurations may incorporate one or more of the systems and techniques described herein.

At operation 102, one or more sensors configured at an autonomous vehicle may detect data in an environment using one or more sensors and generate sensor data based on such detections. In various examples, the sensors may include one or more lidar sensors, camera sensors, radar sensors, sonar sensors, audio sensors, ultrasonic transducers, and/or any other suitable sensors. This data may be collected (or received), stored, and/or processed by a vehicle computing device to perform one or more operations, such as those described herein. In examples, the sensor data collected at that operation 102 may be provided to a deep tracking network (DTN) for processing as described in more detail below.

An example 104 illustrates a top-down view of an environment that includes a vehicle 106 that may be configured with sensors to detect objects in the environment, such as an object 108. A vehicle computing device of the vehicle 106 may be configured to receive sensor data from the sensors of the vehicle 106 and use such sensor data as described herein, for example, to generate a detection box for the object 108.

At operation 110, the vehicle computing system (e.g., a DTN configured therein executing a machine-learned model) may receive pixel data for pixels based on the sensor data. For example, the vehicle computing device may determine pixel data for pixels associated with an object in the environment based on the sensor data (e.g., generated and/or detected by one or more sensor modalities configured at a vehicle) collected at the operation 102 and provide that data to a DTN configured at or interoperating with the vehicle computing device. In examples, other data may be used and/or processed at this operation and elsewhere in the process 100. For example, one or more discretized values of any form of may be received at operation 110.

An example 112 illustrates pixel data and/or discretize values associated with an area 113 and with the object 108 of the example 104. The pixels or values in the example data group 114 may be those pixels or values that have been determined to be associated with an object based on the sensor data captured from the environment of example 104 and for which the vehicle computing device has generated pixel data. In examples, the vehicle computing device may determine a unimodal (e.g. Gaussian) confidence value as well as other parameters, such as center offset values and/or coordinates, length, width, direction, stationariness, yaw, and/or velocity for the individual pixels of the data group 114.

At operation 116, the vehicle computing system (e.g., at a DTN executing a machine-learned model) may determine a unimodal confidence value (e.g., a Gaussian confidence value) for the individual pixels associated with the object. The vehicle computing device (e.g., DTN) may also, or instead, generate other object and/or pixel data for individual pixels associated with the object. This object and/or pixel data may include center offset coordinates and/or values, length, width, direction, stationariness, yaw, and/or velocity, as well as the determined unimodal confidence value. The vehicle computing device may represent this object and/or pixel data as a multichannel data structure, with particular layers of the data structure corresponding to particular types of data, as described in more detail herein. In examples, this multichannel data structure may be generated as multichannel output data by the DTN (e.g., executing a machine-learned model) operating at, or in conjunction with, the vehicle computing system and may include a channel or layer that includes the determined unimodal confidence values for each pixel. Further at operation 116, the vehicle computing system may determine a representation of a unimodal distribution (e.g., a Gaussian curve) of the pixel confidence values associated with the individual pixels associated with the object. For example, the vehicle computing system may use a two-dimensional Gaussian function to generate a Gaussian curve representing the confidence values associated with the pixels. In examples, the resulting unimodal distribution representation of the confidence values may indicate the pixels with relatively higher and lower confidence values.

An example 118 illustrates a top-down, topographic view of a unimodal representation 120 representing the unimodal confidence values determined for the data group 114. In this example, the heavier lines indicate higher confidence values while the thinner lines represent lower confidence values. As shown in this example, the unimodal confidence values of pixels nearer the center of a detected object may be relatively higher than those farther from the center of the object.

At operation 122 the vehicle computing system (e.g., executing a machine-learned model) may determine center points or pixels for candidate detection boxes for an object based on the unimodal distribution generated at the operation 116. For example, the vehicle computing system may determine that those along the unimodal distribution that have unimodal confidence values above a particular threshold may be better candidates for candidate detection box center points than those along the unimodal distribution associated with points below the threshold. The threshold may be a machine-learned threshold generated using a machine-learning (ML) model trained to output a machined-learned threshold value based on initializing the ML model with one or more parameters and an initial, predetermined threshold and then processing a training set of pixel data using variations of the initial, predetermined threshold until a highest quality machine-learned threshold is detected. In various examples, the vehicle computing system may determine an averaged or aggregated unimodal confidence value for more than one pixel and determine the unimodal distribution of confidence values based on the aggregated or averaged unimodal confidence values. The vehicle computing system may then determine those pixels that may be candidates for proposed detection box center points based on the distribution based on the aggregated or averaged unimodal confidence values.

An example 124 illustrates a side view of the unimodal representation 120 representing the unimodal distribution determined based on the unimodal confidence values determined for the data group 114 as input in operation 116. This side view of the unimodal representation 120 may represent a two-dimensional section of the unimodal representation 120 at its highest point (e.g., peak). The threshold line 126 may represent a threshold that may be used by a vehicle computing system to determine pixels for use in generating candidate detection boxes. Those pixels associated with the portion of the unimodal distribution 120 at or above the threshold line 126 may be determined to be candidates for center points of candidate detection boxes, while those pixels associated with the portion of the unimodal distribution 120 below the threshold line 126 may be determined to not be candidates for center points of candidate detection boxes.

At operation 128, the vehicle computing system may generate candidate detection boxes based on the pixels determined at operation 122. For example, the vehicle computing system may generate candidate detection boxes for the pixels determined at operation 122 by decoding one or more of various parameters associated with such pixels and/or represented in the object and/or pixel data structure. Parameters that may be associated with a pixel and/or used to generate a detection box may include, but are not limited to, center coordinates and/or offset values, length, width, direction, stationariness, yaw, and/or velocity.

An example 130 illustrates a top-down view of candidate detection boxes 132 that may be generated based on proposed center pixels 134. In this example, the individual proposed center pixels 134 may have unimodal confidence values that met or exceeded a threshold configured at the vehicle computing device. The vehicle computing device may have then used one or more parameters associated with the proposed center pixels 134 to generate the candidate detection boxes 132.

At operation 136, the vehicle computing system may determine an output detection box. In examples, the vehicle computing system may perform a non-maximum suppression operation using the candidate detection boxes as input to determine the output detection box from among the candidate detection boxes to use in navigating the vehicle and/or for other functions. Alternatively, or in addition, the vehicle computing system may suppress candidate detection boxes meeting one or more criteria (e.g., having a center pixel with a unimodal confidence value below a threshold) and/or may filter out candidate detection boxes using one or more techniques until an output detection box is determined. This output detection box may be an output of the DTN and/or the machine-learned model executed by the DTN to determine the output detection box.

At operation 138, the vehicle computing system may generate or otherwise provide an object detection based on the output detection box determined at operation 136, and/or navigate the vehicle and/or perform other functions based on the output detection box.

An example 140 illustrates a top-down view of the example environment again, including the vehicle 106 and the object 108. As shown in this example, the vehicle computing system has determined the output detection box 142 from among candidate detection boxes 132 for use in representing the object 108. The output detection box 142 may have been generated based on the center pixel 144 that was among the proposed center pixels 134.

In some examples, confidence values determined as discussed herein may be used by downstream processes or may be received by other components along with object data. For example, a prediction system may receive object data and confidence values associated with the data to make predictions about the data. In some examples, a planning system can receive object data and associated confidence values and can plan a trajectory based on the object data and/or confidence values. In some examples, the object data and confidence values can be used to populate an occupancy grid in which an occupied status of individual regions of the occupancy grid can be weighted or otherwise determined based on the confidence values, as discussed herein. Additional examples and contemplated and the scope is not limited to the express examples discussed herein.

Figure 2A:
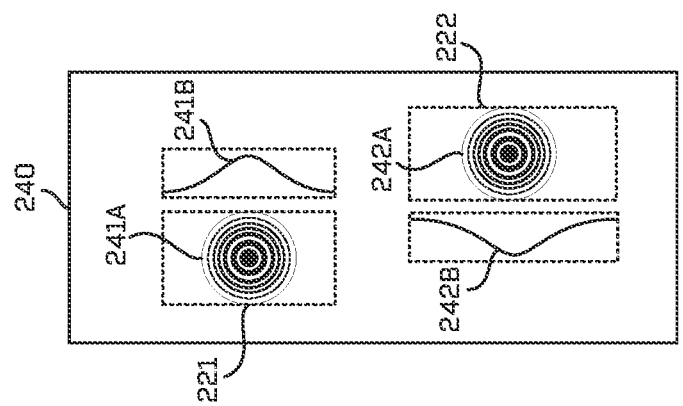
FIGS. 2A-G are diagrammatic representations of data and objects associated with a process for generating a detection box for an object in an environment using center-based detection, in accordance with examples of the disclosure.

FIGS. 2A-G illustrate diagrammatic representations of various data captured and/or generated by a process for generating a detection box for an object in an environment using center-based detection, for example, as performed by a machine-learned model executing in inference mode. FIG. 2A illustrates a top-down view of an example area 210 that includes objects 211 and 212. The area 210 may be a section or area within an environment in which an autonomous vehicle is operating. In order to operate and navigate in the environment safely, the autonomous vehicle may be configured to detect objects, such as objects 211 and 212, in the environment using sensors and one or more other systems, such as a vehicle computing system. As part of this object detection process, the vehicle computing system may capture and/or generate sensor, object, and/or pixel data as described herein.

Figure 2B:
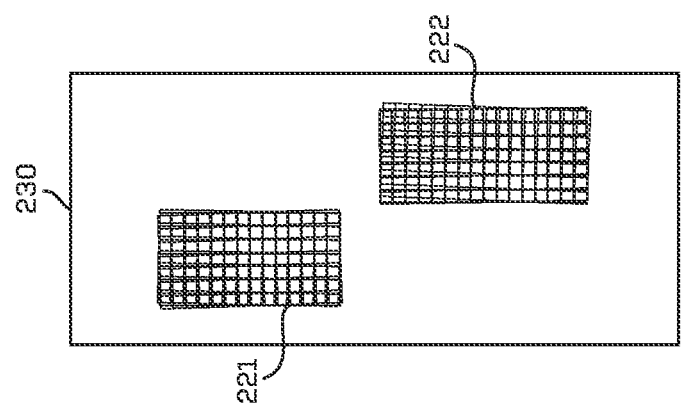

FIG. 2B illustrates the sensor data 220 as generated by a computing system of vehicle, for example, as described herein. The data 220 may include pixels 223 associated with an area and representing sensor data generated by one or more sensors and/or associated systems configured on the vehicle. In FIG. 2B, groups of pixels 221 and 222 may be associated with potential objects in the environment. The groups of pixels 221 and 222 are enlarged for illustrative purposes in this figure and are subsets of the pixels 223.

Figure 2C:
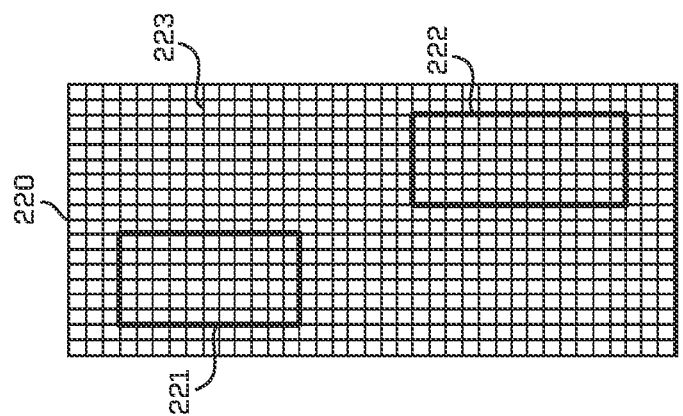

FIG. 2C illustrates pixel data 230 that includes data for groups of pixels 221 and 222. A vehicle computing system may determine pixel data for pixels potentially associated with an object based on the sensor data. For example, a vehicle computing device may generate a unimodal confidence value (e.g., a Gaussian confidence value) for the individual pixels in the pixel groups 221 and 222. The vehicle computing device may also, or instead, generate other data for pixels potentially associated with an object, including pixel data for individual pixels in the pixel groups 221 and 222. This pixel data may include center coordinates and/or offset values, length, width, direction, stationariness, yaw; and/or velocity. Such pixel and/or object data may be represented as a multichannel data structure and/or multichannel input data, with particular layers representing particular types of data, as described in more detail herein.

Figure 2D:
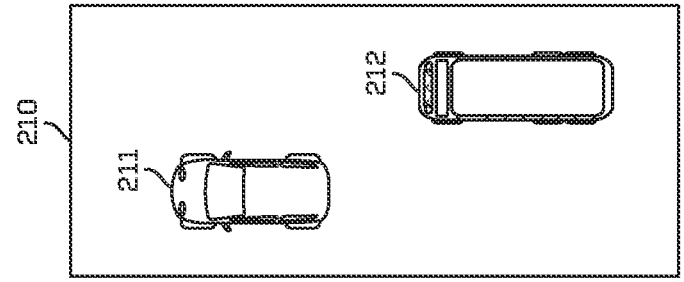

The determined unimodal confidence values of the pixels in the groups 221 and 222 may be used to determine unimodal distributions. For example, as illustrated in example 240 of FIG. 2D, the unimodal distribution of the confidence values of the pixel group 221 are illustrated by a top-down representation 241A and a side view representation 241B. Also shown in FIG. 2D is the unimodal distribution of the confidence values of the pixel group 222, illustrated by a top-down representation 242A and a side view representation 242B. In the example top-down, topographic views of representations 241A and 242A, the heavier lines indicate higher unimodal confidence values while the thinner lines represent lower unimodal confidence values. In the example side views of representations 241B and 242B, the points higher on the illustrated curve correspond to portions of the distribution associated with higher unimodal confidence values while the points lower on the curve correspond to portions of the distribution associated with lower unimodal confidence values. As shown in this example, the portions of the distributions that are associated with confidence values of pixels nearer the center of a detected object may be relatively higher than those farther from the center of the object.

A vehicle computing system may determine center points or pixels for candidate detection boxes for an object based on the unimodal distributions associated with the unimodal confidence values determined for the pixels. For example, the pixels may be determined based on whether they are associated with portions of a unimodal distribution that meet or exceed a threshold value. Referring now to example 250 of FIG. 2E, using the data associated with the representations 241 and 242 of FIG. 2D, a vehicle computing system may determine subsets of the groups of pixels 221 and 222 are associated with portions of their respective associated unimodal distributions that are above a threshold. As noted above, those pixels associated with portions of a unimodal distribution that are above a particular threshold may be better candidates for proposed detection box center points than those associated with portions of a unimodal distribution that are below the threshold. In the example 250, the subsets of pixels 251 and 252 may be determined to be pixels associated with portions of a unimodal distribution that meet or exceed a threshold value and/or having unimodal confidence values that meet or exceed a threshold value.

These subsets of pixels may be used as center pixels to determine candidate detections boxes for objects in the environment. As shown in example 260 of FIG. 2F, the candidate detection boxes 261 and 262 may be determined based on the subsets of pixels 251 and 252, respectively. In examples, the candidate detection boxes 261 and 262 may be generated by decoding parameters associated with the subsets of pixels 251 and 252. For example, the candidate detection boxes 261 and 262 may be determined based on one or more of center coordinates and/or offset values, a length, a width, a direction, stationariness, yaw, and/or velocity associated with a respective proposed detection box center pixels 251 and 252, respectively.

Figure 2G:
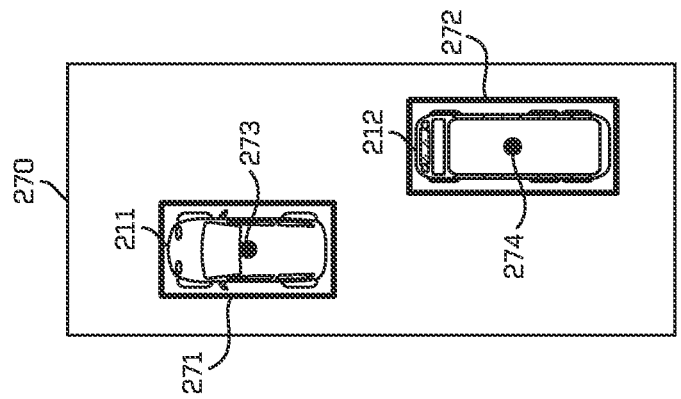
Figure 2F:
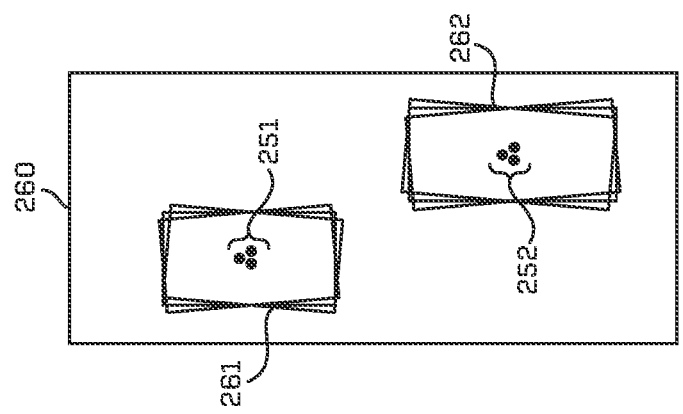
Figure 2E:
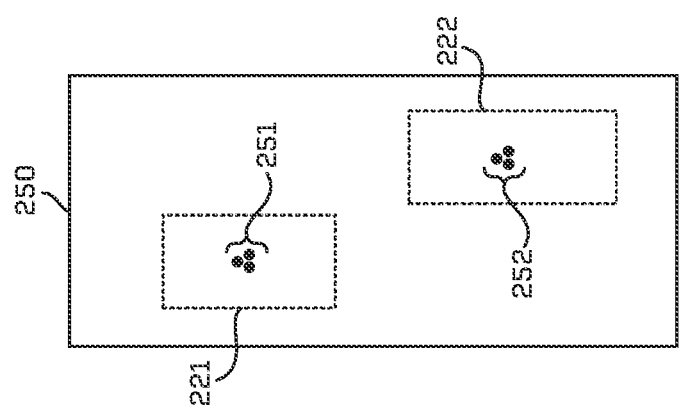

Referring now to example 270 of FIG. 2G, to determine a output detection box to use for the objects 211 and 212 detected in the environment, one or more non-maximum suppression operations may be performed using the candidate detection boxes 261 and 262 as input to determine output detection boxes 271 and 272, respectively, from among the candidate detection boxes. Multichannel output data based on or otherwise associated with the output detection box may also be determined (e.g., for use in operations associated with controlling a vehicle).

Figure 3:
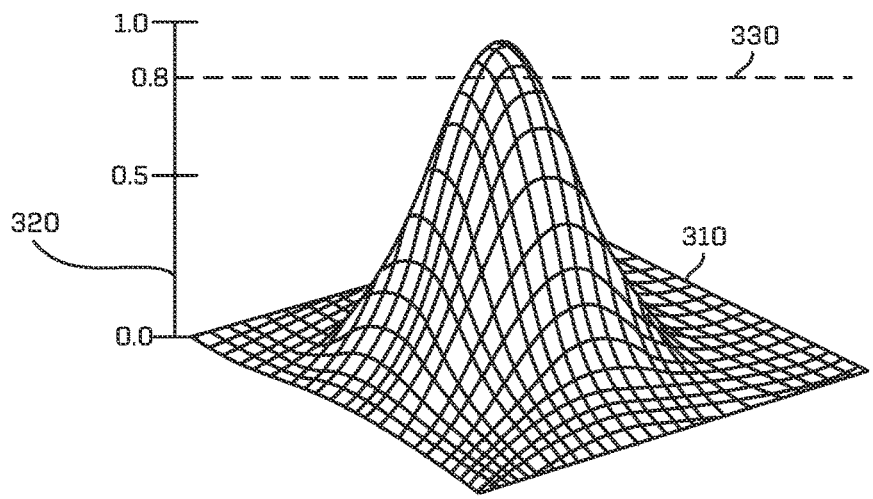
FIG. 3 is a diagrammatic representation of example curve representing unimodal confidence values, in accordance with examples of the disclosure.

FIG. 3 illustrates a three-dimensional plot of an example unimodal (e.g., Gaussian) distribution of unimodal pixel confidence values. The distribution 310 may represent a set of unimodal confidence values associated with a set of pixels associated with sensor data. The range of the distribution 310 may be measured against the z axis scale 320. In this example, the range of the distribution 310 may be between 0.0 and 1.0. A threshold 330 of 0.8 is also illustrated. In examples, those pixels associated with portions of the distribution 310 that are at or above the threshold 330 may be used as center pixels for candidate detection boxes, as described herein. Those pixels associated with portions of the distribution 310 that are below the threshold 330 may not be used as center pixels for candidate detection boxes.

Figure 4:
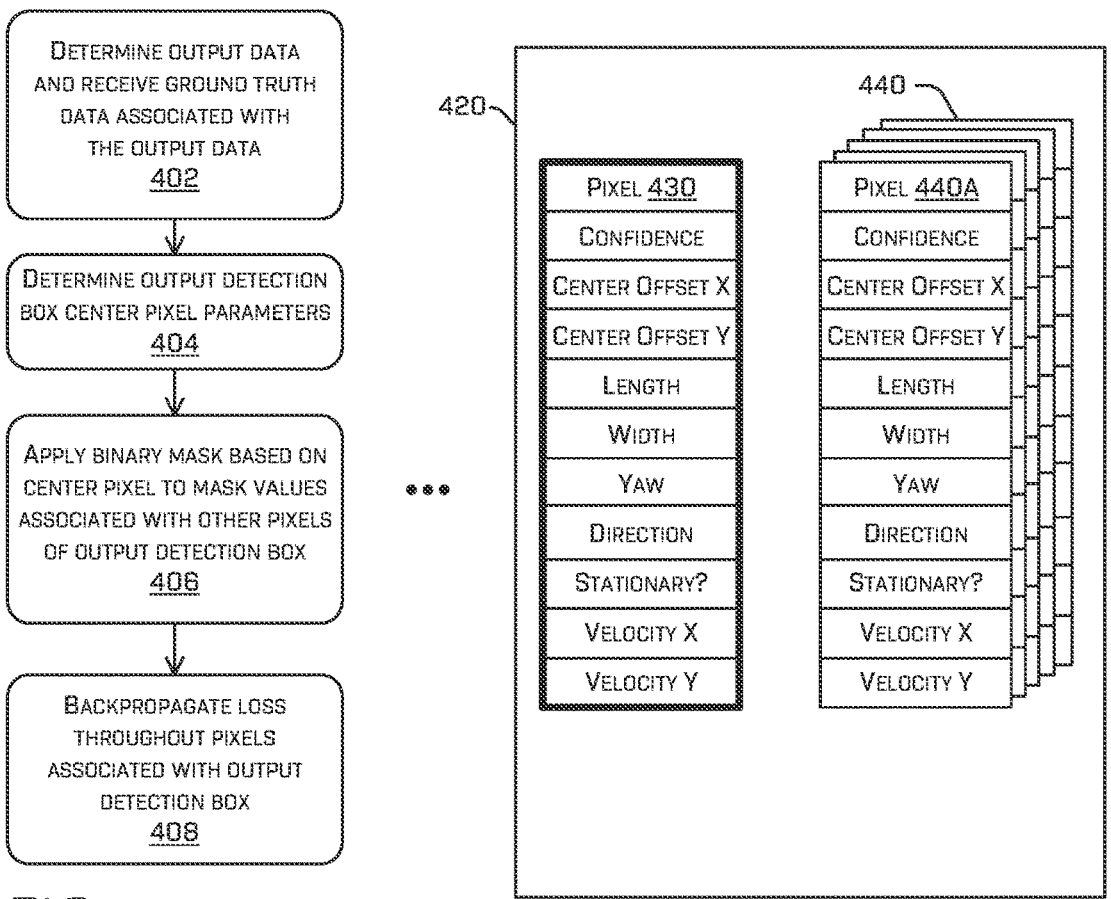
FIG. 4 is a pictorial flow diagram of an example process for generating and populating detection box pixels with one or more center pixel parameters, in accordance with examples of the disclosure.

FIG. 4 is a pictorial flow diagram of an example process 400 that may be performed as part of training a machine-learned model as described herein. In process 400, a machine learned model can be trained to output object data and unimodal confidence values associated with the object data. In examples, one or more operations of the process 400 may be implemented during the training mode of a machine-learned model (e.g., executed by a DTN) used by a vehicle computing system, such as by using one or more of the components and systems illustrated in FIG. 5 and described below. For example, one or more components and systems can include those associated with a deep tracking network 532 illustrated in FIG. 5. In examples, the one or more operations of the process 400 may be performed by a remote system in communication with a vehicle, such as the deep tracking network 550 illustrated in FIG. 5. In still other examples, the one or more operations of the process 400 may be performed by a combination of a remote system and a vehicle computing systems. However, the process 400 is not limited to being performed by such components and systems, and the components and systems of FIG. 5 are not limited to performing the process 400.

At operation 402, a machine-learned model executing in training mode may determine object data which, when decoded and output as a detection box (e.g., an output detection box), can be compared to ground truth data representing a known bounding box and other object parameters using the unimodal (e.g., Gaussian) confidence values and/or candidate detection box filtering and/or suppression techniques (e.g., NMS), for example, as described herein. At operation 404, the model may determine the parameters of the center pixel or center discretized value of the detection box. In examples, pixel and/or discretized value parameters may be represented in layers in multichannel or multilayer data structure (e.g., a tensor data structure). For example, individual layers of a multilayer data structure may contain data associated with a particular type of pixel data. Each column of such a data structure may be associated with a particular pixel.

For example, and referring now to example 420, a center pixel 430 may be a center pixel of a detection box. The pixels 440 may be the other pixels (e.g., ground truth pixels) associated with the detection box. The center pixel 430 may be associated with one or more of a confidence value (e.g., a unimodal confidence value, a Gaussian confidence value, etc.), a center offset X value, a center offset Y value, a length, a width, a yaw value, a direction, a stationariness or motion state, a velocity X value, and a velocity Y value. These individual parameters may be associated with a particular individual layer of a multilayer data structure and with a particular column in the data structure that is associated with the center pixel. Similarly, the pixels 440 may also have parameters associated with particular layers based on the type of parameter and in a particular column associated with the respective pixel.

At operation 406, the model may be configured to apply a binary mask to the data output by the model to determine the loss based on the center pixel of the output data.

At operation 408, the model may determine and backpropagate loss for one or more parameters of the individual pixels associated with the detection box. For example, for the various parameters of pixels 440, the model may backpropagate a regression loss (e.g., focal loss, propagation loss, classification loss, etc.), for one or more parameters of the pixels 440. In examples, a focal loss may be determined for the unimodal confidence values of the pixels 440. This focal loss may then be backpropagated to the pixels 440 as the model is trained. In this way, data having more accurate object information (e.g., associated with pixels closer to the center of the object) may contribute more to training the model than data that may have less accurate information (e.g., associated with pixels farther from the center of the object).

FIG. 5 depicts a block diagram of an example system 500 for implementing the techniques described herein. In at least one example, the system 500 can include a vehicle 502. The vehicle 502 can include a vehicle computing device 504 that may function as and/or perform the functions of a vehicle controller for the vehicle 502. The vehicle 502 can also include one or more sensor systems 506, one or more emitters 508, one or more communication connections 510, at least one direct connection 512, and one or more drive systems 514.

The vehicle computing device 504 can include one or more processors 516 and memory 518 communicatively coupled with the one or more processors 516. In the illustrated example, the vehicle 502 is an autonomous vehicle; however, the vehicle 502 could be any other type of vehicle. In the illustrated example, the memory 518 of the vehicle computing device 504 stores a localization component 520, a perception component 522, a planning component 524, one or more system controllers 526, one or more maps 528, a prediction component 530, and a deep tracking network component 532. Though depicted in FIG. 5 as residing in memory 518 for illustrative purposes, it is contemplated that each of the localization component 520, the perception component 522, the planning component 524, the one or more system controllers 526, the one or more maps 528, the prediction component 522, and the deep tracking network component 532 can additionally, or alternatively, be accessible to the vehicle 502 (e.g., stored remotely).

In at least one example, the localization component 520 can include functionality to receive data from the sensor system(s) 506 to determine a position and/or orientation of the vehicle 502 (e.g., one or more of an x-, y-, z-position, roll, pitch, or yaw). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 520 can provide data to various components of the vehicle 502 to determine an initial position of an autonomous vehicle for generating a trajectory and/or for generating map data, as discussed herein.

In some instances, the perception component 522 can include functionality to perform object detection, segmentation, and/or classification. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, traffic signal, traffic light, car light, brake light, unknown, etc.). In additional or alternative examples, the perception component 522 can provide processed sensor data that indicates one or more characteristics associated with a detected entity (e.g., a tracked object) and/or the environment in which the entity is positioned. The perception component 522 may use the multichannel data structures as described herein, such as the multichannel data structures generated by the described deconvolution process, to generate processed sensor data. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Such entity characteristics may be represented in a multichannel data structure as described herein (e.g., a multichannel data structure generated as output of one or more deconvolution layers using a learned upsampling factor). Characteristics associated with the environment can include, but are not limited to, a presence of another entity in the environment, a state of another entity in the environment, a time of day, a day of a week, a season, a weather condition, an indication of darkness/light, etc.

In general, the planning component 524 can determine a path for the vehicle 502 to follow to traverse through an environment. In examples, the planning component 524 can determine various routes and trajectories and various levels of detail. For example, the planning component 524 can determine a route (e.g., planned route) to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 524 can generate an instruction for guiding the autonomous vehicle along at least a portion of the route from the first location to the second location. In at least one example, the planning component 524 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate.

In at least one example, the vehicle computing device 504 can include one or more system controllers 526, which can be configured to control steering, propulsion, braking, safety, emitters, communication, and other systems of the vehicle 502. These system controller(s) 526 can communicate with and/or control corresponding systems of the drive system(s) 514 and/or other components of the vehicle 502.

The memory 518 can further include one or more maps 528 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 528 can include at least one map (e.g., images and/or a mesh). In some examples, the vehicle 502 can be controlled based at least in part on the maps 528. That is, the maps 528 can be used in connection with the localization component 520, the perception component 522, and/or the planning component 524 to determine a location of the vehicle 502, identify objects in an environment, and/or generate routes and/or trajectories to navigate within an environment.

In some examples, the one or more maps 528 can be stored on a remote computing device(s) (such as the computing device(s) 542) accessible via network(s) 540. In some examples, multiple maps 528 can be stored based on, for example, a characteristic (e.g., type of entity, time of day, day of week, season of the year, etc.). Storing multiple maps 528 can have similar memory requirements but increase the speed at which data in a map can be accessed.

In general, the prediction component 530 can generate predicted trajectories of objects in an environment. For example, the prediction component 530 can generate one or more predicted trajectories for vehicles, pedestrians, animals, and the like within a threshold distance from the vehicle 502. In some instances, the prediction component 530 can measure a trace of an object and generate a trajectory for the object based on observed and predicted behavior.

In some instances, aspects of some or all of the components discussed herein can include any models, algorithms, and/or machine learning algorithms. For example, in some instances, the components in the memory 518 (and the memory 546, discussed below) can be implemented as a neural network. For instance, the memory 518 may include a deep tracking network 532 that may be configured with a convolutional neural network (CNN) 534. The CNN 534 may include one or more convolutional layers and/or deconvolutional layers.

As described herein, an example neural network is an algorithm that passes input data through a series of connected layers to produce an output. Each layer in a neural network can also comprise another neural network or can comprise any number of layers, each of which may convolutional, deconvolutional, or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a learned upsampling factor. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 506 can include radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, microphones, wheel encoders, environment sensors (e.g., temperature sensors, humidity sensors, light sensors, pressure sensors, etc.), etc. The sensor system(s) 506 can include multiple instances of each of these or other types of sensors. For instance, the camera sensors can include multiple cameras disposed at various locations about the exterior and/or interior of the vehicle 502. The sensor system(s) 506 can provide input to the vehicle computing device 504. Additionally, or alternatively, the sensor system(s) 506 can send sensor data, via the one or more networks 540, to the one or more computing device(s) at a particular frequency, after a lapse of a predetermined period of time, in near real-time, etc.

The vehicle 502 can also include one or more emitters 508 for emitting light (visible and/or non-visible) and/or sound.

The emitter(s) 508 in an example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 in this example may also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 502 can also include one or more communication connection(s) 510 that enable communication between the vehicle 502 and one or more other local or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals, etc.). The communications connection(s) 510 also enable the vehicle 502 to communicate with a remote teleoperations computing device or other remote services.

The communications connection(s) 510 can include physical and/or logical interfaces for connecting the vehicle computing device 504 to another computing device or a network, such as network(s) 540. For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 can include one or more drive systems 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor systems to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 514. Furthermore, the drive system(s) 514 may also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle. In some instances, the direct connection 512 can further releasably secure the drive system(s) 514 to the body of the vehicle 502.

In some examples, the vehicle 502 can send sensor data to one or more computing device(s) 542 via the network(s) 540. In some examples, the vehicle 502 can send raw sensor data to the computing device(s) 542. In other examples, the vehicle 502 can send processed sensor data and/or representations of sensor data (e.g., multichannel data structures representing sensor data) to the computing device(s) 542. In some examples, the vehicle 502 can send sensor data to the computing device(s) 542 at a particular frequency, after a lapse of a predetermined period of time, in near real-time, etc. In some cases, the vehicle 502 can send sensor data (raw or processed) to the computing device(s) 542 as one or more log files.

The computing device(s) 542 can include processor(s) 544 and a memory 546 storing a deep tracking network component 550 and/or a perception component 548. In some instances, the deep tracking network component 550 can substantially correspond to the deep tracking network component 532 and can include substantially similar functionality. For example, the deep tracking network component 550 may include a convolutional neural network (CNN) 552 that may be configured with one or more convolution layers and/or deconvolution layers. In some instances, the perception component 548 can substantially correspond to the perception component 522 and can include substantially similar functionality.

The processor(s) 516 of the vehicle 502 and the processor(s) 544 of the computing device(s) 542 can be any suitable processor capable of executing instructions to process data and perform operations as described herein. By way of example and not limitation, the processor(s) 516 and 544 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518 and 546 are examples of non-transitory computer-readable media. The memory 518 and 546 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with the computing device(s) 542 and/or components of the computing device(s) 542 can be associated with the vehicle 502. That is, the vehicle 502 can perform one or more of the functions associated with the computing device(s) 542, and vice versa.

Example Clauses

A: A system comprising: one or more processors; and one or more non-transitory computer-readable media storing instructions executable by the one or more processors, wherein the instructions, when executed, cause the system to perform operations comprising: receiving sensor data from a sensor associated with an autonomous vehicle in an environment; determining, based at least in part on the sensor data, first multichannel data; inputting the first multichannel data to a machine-learned model; determining, by the machine-learned model, Gaussian confidence values for pixels associated with an object in the environment; determining, based at least in part on the Gaussian confidence values, a plurality of proposed center pixels from the pixels associated with the object; determining candidate detection boxes for individual pixels of plurality of proposed center pixels; determining, based at least in part on non-maximum suppression, an output detection box based at least in part on the candidate detection boxes; generating, based at least in part on a center pixel associated with the output detection box, second multichannel data representing the object; tracking, as a tracked object, the object based at least in part on the second multichannel data; and controlling the autonomous vehicle based at least in part on the tracked object.

B: The system of paragraph A, wherein the machine-learned model is trained to determine the Gaussian confidence values for the pixels based on a focal loss.

C: The system of paragraph A or B, wherein a channel of the second multichannel data comprises one or more of: center offset values; classification; dimensions; yaw; velocity; or a motion state.

D: The system of any of paragraphs A-C, wherein a channel of the second multichannel data comprises Gaussian confidence values for pixels associated with the output detection box.

E: The system of any of paragraphs A-D, wherein determining the plurality of proposed center pixels comprises determining, based at least in part on the Gaussian confidence values, that Gaussian confidence values for individual pixels of the plurality of proposed center pixels meet or exceed a threshold value.

F: The system of any of paragraphs A-E, wherein the output detection box is associated with an object detection of one or more of: a vehicle; a bicycle; or a pedestrian.

G: A method comprising: receiving sensor data from a sensor associated with a vehicle in an environment; determining, based at least in part on the sensor data, input data; inputting the input data to a machine-learned model; determining, by the machine-learned model, unimodal confidence values for discretized values associated with an object represented in the input data; determining, based at least in part on the unimodal confidence values, a proposed center value from the discretized values associated with the object; determining, based at least in part on the proposed center value, a candidate detection box representing the object; determining, based at least in part on the candidate detection box, an output detection box; and controlling the vehicle based at least in part on the output detection box.

H: The method of paragraph G, wherein the machine-learned model is trained to determine the unimodal confidence values for the discretized values based on a focal loss.

I: The method of paragraph G or H, further comprising generating, based at least in part on a center value associated with the output detection box, multichannel output data representing the object.

J: The method of paragraph I, wherein a channel of the multichannel output data comprises unimodal confidence values for discretized values associated with the output detection box.

K: The method of paragraph I, wherein a channel of the multichannel output data comprises one or more of: center offset values; classification; dimensions; yaw; velocity; or a motion state.

L: The method of any of paragraphs G-K, wherein determining the output detection box comprises performing a non-maximum suppression operation based at least in part on the candidate detection box.

M: The method of any of paragraphs G-L, wherein determining the proposed center value comprises determining, based at least in part on the unimodal confidence values, that a unimodal confidence value for the proposed center value meets or exceeds a threshold value.

N: The method of any of paragraphs G-M, wherein the input data represents a top-down perspective view of the environment.

O: One or more non-transitory computer-readable media storing instructions that, when executed by one or more processors, perform operations comprising: receiving sensor data from a sensor associated with a vehicle in an environment; determining, based at least in part on the sensor data, input data; inputting the input data to a machine-learned model; determining, by a machine-learned model, unimodal confidence values for discretized values associated with an object represented in the input data; determining, based at least in part on the unimodal confidence values, a proposed center value from the discretized values associated with the object; determining, based at least in part on the proposed center value, a candidate detection box; determining, based at least in part on the candidate detection box, an output detection box; and controlling the vehicle based at least in part on the output detection box.

P: The one or more non-transitory computer-readable media of paragraph O wherein the machine-learned model is trained to determine the unimodal confidence values for the discretized values based on a focal loss.

Q: The one or more non-transitory computer-readable media of paragraph O or P, wherein determining the proposed center value comprises determining, based at least in part on the unimodal confidence values, that a unimodal confidence value for the proposed center value meets or exceeds a threshold value.

R: The one or more non-transitory computer-readable media of paragraph Q, wherein the threshold value is a machine-learned threshold value.

S: The one or more non-transitory computer-readable media of any of paragraphs O-R, wherein determining the output detection box comprises performing a non-maximum suppression operation based at least in part on the candidate detection box.

T: The one or more non-transitory computer-readable media of any of paragraphs O-S, wherein determining unimodal confidence values for the discretized values associated with the object comprises determining Gaussian confidence values for the discretized values associated with the object.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
receiving sensor data from a sensor associated with an autonomous vehicle in an environment;
determining, based at least in part on the sensor data, first multichannel data;
inputting the first multichannel data to a machine-learned model;

determining, by the machine-learned model, Gaussian confidence values for pixels associated with an object in the environment;
determining, based at least in part on the Gaussian confidence values, a plurality of proposed center pixels from the pixels associated with the object;
determining candidate detection boxes for individual pixels of plurality of proposed center pixels;
determining, based at least in part on non-maximum suppression, an output detection box based at least in part on the candidate detection boxes;
generating, based at least in part on a center pixel associated with the output detection box, second multichannel data representing the object;
tracking, as a tracked object, the object based at least in part on the second multichannel data; and
controlling the autonomous vehicle based at least in part on the tracked object.

2. The system of claim 1, wherein the machine-learned model is trained to determine the Gaussian confidence values for the pixels based on a focal loss.

3. The system of claim 1, wherein a channel of the second multichannel data comprises one or more of:
center offset values;
classification;
dimensions;
yaw;
velocity; or
a motion state.

4. The system of claim 1, wherein a channel of the second multichannel data comprises Gaussian confidence values for pixels associated with the output detection box.

5. The system of claim 1, wherein determining the plurality of proposed center pixels comprises determining, based at least in part on the Gaussian confidence values, that Gaussian confidence values for individual pixels of the plurality of proposed center pixels meet or exceed a threshold value.

6. The system of claim 1, wherein the output detection box is associated with an object detection of one or more of:
a vehicle;
a bicycle; or
a pedestrian.

7. A method comprising:
receiving sensor data from a sensor associated with a vehicle in an environment; determining, based at least in part on the sensor data, input data;
inputting the input data to a machine-learned model;
determining, by the machine-learned model, unimodal confidence values for discretized values associated with an object represented in the input data;
determining, based at least in part on the unimodal confidence values, a plurality of proposed center value values from the discretized values associated with the object;
determining, based at least in part on the plurality of proposed center value values, candidate detection boxes for individual values of the plurality of proposed center values representing the object;
determining, based at least in part on the candidate detection boxes, an output detection box; and
controlling the vehicle based at least in part on the output detection box.

8. The method of claim 7, wherein the machine-learned model is trained to determine the unimodal confidence values for the discretized values based on a focal loss.

9. The method of claim 7, further comprising generating, based at least in part on a center value associated with the output detection box, multichannel output data representing the object.

10. The method of claim 9, wherein a channel of the multichannel output data comprises unimodal confidence values for discretized values associated with the output detection box.

11. The method of claim 9, wherein a channel of the multichannel output data comprises one or more of:
center offset values;
classification;
dimensions;
yaw;
velocity; or
a motion state.

12. The method of claim 7, wherein determining the output detection box comprises performing a non-maximum suppression operation based at least in part on the candidate detection boxes.

13. The method of claim 7, wherein determining the plurality of proposed center value values comprises determining, based at least in part on the unimodal confidence values, that individual unimodal confidence value values for individual proposed center value meets or exceeds values of the plurality of proposed center values meet or exceed a threshold value.

14. The method of claim 7, wherein the input data represents a top-down perspective view of the environment.

15. One or more non-transitory computer-readable media storing instructions that, when executed by one or more processors, perform operations comprising:
receiving sensor data from a sensor associated with a vehicle in an environment;
determining, based at least in part on the sensor data, input data;
inputting the input data to a machine-learned model;
determining, by a machine-learned model, unimodal confidence values for discretized values associated with an object represented in the input data;
determining, based at least in part on the unimodal confidence values, a plurality of proposed center value values from the discretized values associated with the object;
determining, based at least in part on the plurality of proposed center value values, candidate detection boxes for individual values of the plurality of proposed center values;
determining, based at least in part on the candidate detection boxes, an output detection box; and
controlling the vehicle based at least in part on the output detection box.

16. The one or more non-transitory computer-readable media of claim 15, wherein the machine-learned model is trained to determine the unimodal confidence values for the discretized values based on a focal loss.

17. The one or more non-transitory computer-readable media of claim 15, wherein determining the plurality of proposed center value values comprises determining, based at least in part on the unimodal confidence values, that individual unimodal confidence value values for individual proposed center value meets or exceeds values of the plurality of proposed center values meet or exceed a threshold value.

18. The one or more non-transitory computer-readable media of claim 17, wherein the threshold value is a machine-learned threshold value.

19. The one or more non-transitory computer-readable media of claim 15, wherein determining the output detection box comprises performing a non-maximum suppression operation based at least in part on the candidate detection boxes.

20. The one or more non-transitory computer-readable media of claim 15, wherein determining unimodal confidence values for the discretized values associated with the object comprises determining Gaussian confidence values for the discretized values associated with the object.

* * * * *

UNITED STATES PATENT AND TRADEMARK OFFICE
CERTIFICATE OF CORRECTION

| | | |
|---|---|---|
| PATENT NO. | : 12,080,074 B2 | Page 1 of 1 |
| APPLICATION NO. | : 17/537920 | |
| DATED | : September 3, 2024 | |
| INVENTOR(S) | : Qian Song et al. | |

It is certified that error appears in the above-identified patent and that said Letters Patent is hereby corrected as shown below:

In the Claims

Column 19, Line 8, change "pixels of plurality" to -- pixels of the plurality --

Signed and Sealed this
First Day of October, 2024

Katherine Kelly Vidal
*Director of the United States Patent and Trademark Office*